US009098601B2

(12) United States Patent
Wang (10) Patent No.: US 9,098,601 B2
(45) Date of Patent: Aug. 4, 2015

(54) TERNARY CONTENT-ADDRESSABLE MEMORY ASSISTED PACKET CLASSIFICATION

(71) Applicant: Futurewei Technologies, Inc., Plano, TX (US)

(72) Inventor: Zixiong Wang, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 204 days.

(21) Appl. No.: 13/926,303

(22) Filed: Jun. 25, 2013

(65) Prior Publication Data

US 2014/0006706 A1 Jan. 2, 2014

Related U.S. Application Data

(60) Provisional application No. 61/664,796, filed on Jun. 27, 2012.

(51) Int. Cl.
*G06F 17/30* (2006.01)
*H04L 12/879* (2013.01)

(52) U.S. Cl.
CPC ........ *G06F 17/30982* (2013.01); *H04L 49/901* (2013.01)

(58) Field of Classification Search
None
See application file for complete search history.

(56) References Cited

U.S. PATENT DOCUMENTS

| 7,002,965 | B1 * | 2/2006 | Cheriton | 370/395.32 |
| 2006/0167843 | A1 * | 7/2006 | Allwright et al. | 707/3 |
| 2008/0192754 | A1 | 8/2008 | Ku et al. | |
| 2009/0171651 | A1 | 7/2009 | Lunteren et al. | |
| 2011/0307656 | A1 * | 12/2011 | Hamdi et al. | 711/108 |

FOREIGN PATENT DOCUMENTS

| CN | 101072178 A | 11/2007 |
| CN | 101247337 A | 8/2008 |
| CN | 101741737 A | 6/2010 |
| EP | 2512073 A1 | 10/2012 |

OTHER PUBLICATIONS

Foreign Communication from a Counterpart Application, PCT Application PCT/CN2013/078203, International Search Report, dated Oct. 10, 2013, 6 pages.
Foreign Communication from a Counterpart Application, PCT Application PCT/CN2013/078203, Written Opinion, dated Oct. 10, 2013, 4 pages.

(Continued)

*Primary Examiner* — Gary Portka
(74) *Attorney, Agent, or Firm* — Conley Rose, P.C.; Grant Rodolph; Nicholas K. Beaulieu (57) ABSTRACT

A method of packet classification implemented by a network router, the method comprising obtaining a packet whose header comprises a plurality of dimensional fields specified by a set of rules, matching one or more bits in at least two of the dimensional fields with a corresponding entry stored in a ternary content-addressable memory (TCAM), generating a hash key based on data associated with the corresponding entry in the TCAM, wherein the associated data is stored in at least one non-TCAM memory, searching, using the hash key, a multi-dimensional trie stored in the at least one non-TCAM memory, and mapping the packet to one or more of the set of rules based on the search.

24 Claims, 7 Drawing Sheets

(56) References Cited

OTHER PUBLICATIONS

Gupta, P. et al. "Algorithms for Packet Classification," IEEE Network, Mar./Apr. 2001, pp. 24-32.

Wang, Z. et al., U.S. Appl. No. 13/464,840, filed May 4, 2012, "Optimized Trie-Based Address Lookup", 47 pgs.

Singh, S. et al., "Packet Classification Using Multidimensional Cutting," SIGCOMM'03, Karlsruhe, Germany, Aug. 25-29, 2003, 12 pgs.

* cited by examiner

100

| Rules | Source Prefix | Destination Prefix | Source Port | Destination Port | Protocol |
|---|---|---|---|---|---|
| R0 | 1000* | * | 80 | * | TCP |
| R1 | 111* | 101* | 80 | 80 | TCP |
| R2 | 0* | 101* | 80 | 80 | TCP |
| R3 | 101* | 11* | >1024 | >1024 | TCP |
| R4 | 01* | 0001* | 80 | 80 | TCP |
| R5 | 11* | 0100* | 80 | 80 | TCP |
| R6 | 101* | 1011* | >1024 | >1024 | TCP |
| R7 | 01* | 11* | 80 | 80 | TCP |
| R8 | 01* | 1* | 80 | 80 | TCP |
| R9 | 0* | 10* | 80 | 80 | TCP |

| Destination network address prefix | Label | Value | Mask |
|---|---|---|---|
| Q3 | D0 | 11 | 00 |
| Q4 | D1 | 00 | 10 |
| Q6 | D2 | 01 | 11 |
| Q5 | D3 | 10 | 10 |

TERNARY CONTENT-ADDRESSABLE MEMORY ASSISTED PACKET CLASSIFICATION

CROSS-REFERENCE TO RELATED APPLICATIONS

The present application claims priority to U.S. Provisional Patent Application No. 61/664,796 filed Jun. 27, 2012 by Zixiong Wang and entitled "A Ternary Content-Addressable Memory Assisted Packet Classification Algorithm", which is incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In network communication, efforts to continuously improve the efficiency and security of network operation is an important goal for Internet users. Packet classification may distinguish or classify data packets based on multiple dimensions of information carried in packet headers, and thereby implement access control, traffic engineering, intrusion detection, and many other network services. More specifically, a network router may classify incoming packets into different flows and then to perform appropriate actions depending on the classification.

A packet classifier may use a set of filters or rules to specify packet classes. For example, a rule in an access control list (ACL) may specify a set of source and destination network address prefixes and associate a corresponding action with the rule (e.g., deny or permit access to a certain service or device). An ACL may comprise a set of rules applied to a variety of fields in a packet header, wherein each field is also called a dimension. For an example, for packets using Transport Layer Protocol (TCP), five dimensions including source port numbers, destination port numbers, source Internet Protocol (IP) network address prefixes, destination IP network address prefixes, and network protocols may be used. Various network services or devices, such as servers, routers, and switches, may be equipped with or subject to ACLs. For instance, in data center (DC) and cloud applications, packet classification and ACL may need to be performed at a high speed (e.g., on the order of tera bit per second), and latency in network ACL lookup may need to be low. The goal of high throughput may present a challenge for efficient implementation of packet classification algorithms.

SUMMARY

In one embodiment, the disclosure includes a method of packet classification implemented by a network router, the method comprising obtaining a packet whose header comprises a plurality of dimensional fields specified by a set of rules, matching one or more bits in at least two of the dimensional fields with a corresponding entry stored in a ternary content-addressable memory (TCAM), generating a hash key based on data associated with the corresponding entry in the TCAM, wherein the associated data is stored in at least one non-TCAM memory, searching, using the hash key, a multi-dimensional trie stored in the at least one non-TCAM memory, and mapping the packet to one or more of the set of rules based on the search.

In another embodiment, the disclosure includes an apparatus comprising a TCAM configured to store an entry for at least two of a plurality of dimensions specified by a set of rules, at least one non-TCAM memory configured to store data associated with the entry in the TCAM, and a multi-dimensional trie for the at least two dimensions, a receiver configured to receive a packet comprising a plurality of fields in the plurality of dimensions, a processor that is coupled to the receiver, the TCAM, and the at least one non-TCAM memory and is configured to match one or more bits in each of at least two of the fields with the entry, generate a hash key based on the data associated with the entry, search the multi-dimensional trie using the hash key, and map the packet to one or more rules in the set of rules based on the search.

In yet another embodiment, the disclosure includes a network router comprising a TCAM configured to store a source address prefix and a destination address prefix, and a TCAM associated data (AD) table coupled to the TCAM and configured to store associated data for the source address prefix and the destination address prefix, a hashed subtrie table coupled to the TCAM AD table and configured to store a plurality of address prefixes represented by one or more subtries which belong to a multi-dimensional trie, wherein each subtrie is locatable by a hash key at least partially based on the associated data for each prefix stored in the TCAM, a product table coupled to the hashed subtrie table and configured to store pairs of labels assigned to the plurality of address prefixes, and a rule table coupled to the product table and configured to store rules each corresponding to a pair of labels in the product table.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

There may be potential issues with some existing packet classification schemes or methods, which may be either purely ternary content-addressable memory (TCAM)-based or algorithm-based. Examples of algorithms used in packet classification may include heuristic multi-dimensional cutting algorithm, multi-dimensional trie search algorithms, and TCAM assisted algorithms, each of which may carry its own drawbacks. For example, heuristic cutting algorithms may require a high memory bandwidth, and this problem may be exacerbated by the high throughput requirement for data center applications. For another example, existing multi-dimensional trie search algorithms may lead to long latency and may be area inefficient.

For yet another example, existing TCAM-assisted algorithms use TCAM, which is a special type of content-addressable memory (CAM) that allows a ternary matching state of "X" or "do not care" for one or more bits in a stored dataword, such as a network address. In comparison, a non-TCAM memory (e.g., a binary CAM) may use data search words consisting entirely of 1s and 0s. The use of TCAM may help achieve low cost and area efficient search engine implementation for enterprise network processing unit (NPU) chipsets. However, existing TCAM-assisted algorithms may consume a relatively large area of TCAM, which may often be expensive. As a result, in data center and cloud applications, desired attributes such as high throughput, fast update, and low latency may be challenging to meet using existing algorithms. Thus, there remains a need for improved packet classification and ACL implementations to meet the challenges of modern data centers.

Disclosed herein are example embodiments that allow packet classification and ACL to be assisted by a TCAM as well as a multi-dimensional hashed trie stored in a non-TCAM memory. According to an example embodiment, the TCAM may be configured to store source address prefixes and destination address prefixes. In use, a packet comprising a source network address and a destination network address may be received by a network router, which may then determine a match between the source address and a source address prefix in the TCAM and/or a match between the destination address and a destination address prefix in the TCAM. Further, the router may compute a hash key generated based on data associated with the prefixes and the addresses in the packet. Subtries belonging to the hashed trie may be searched using the hash key. Further, the subtries may comprise address prefixes as well as labels assigned to each of them to reflect parent-child relationship of associated prefixes. Based on the search of a subtrie, pairs of source and destination labels stored in a product table may be identified, and corresponding rules may be matched to the packet. Overall, embodiments disclosed herein may help realize high throughput, fast update, and low latency in data center and cloud applications.

Figure 1A:
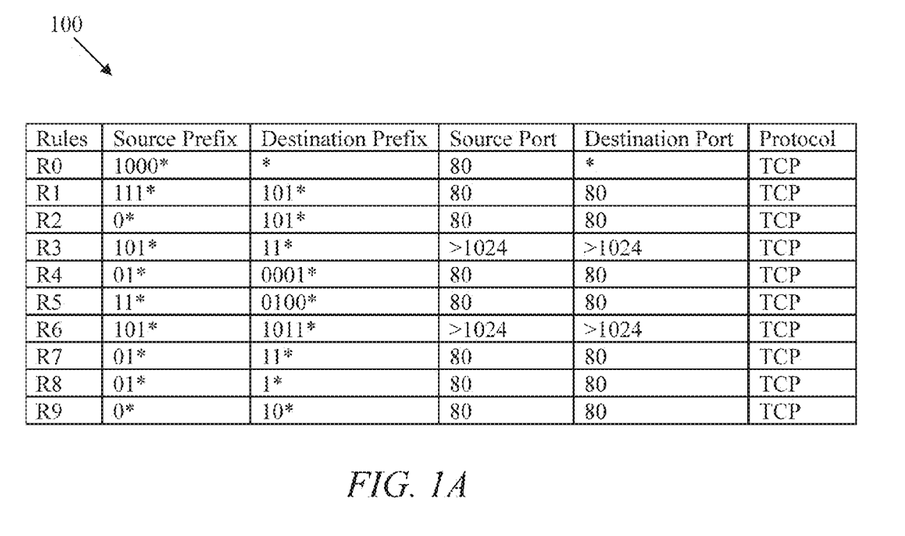
FIG. 1A illustrates an exemplary rule database.

FIG. 1A illustrates an exemplary rule table or database 100. For illustrative purposes, the rule database 100 comprises 10 rules (denoted as R0-R9), each of which comprises 5 dimensions or aspects. It should be understood that any number of rules may be included in a rule database, and a rule may comprise any suitable number of dimensions. As shown in FIG. 1, each rule may be specified or characterized by dimensions including source address prefix, destination address prefix, source port, destination port, and network protocol. The source and destination address prefixes may be made by part of any suitable type of network addresses, such as internet protocol (IP) address and media access layer (MAC) address. The source and destination ports may have any suitable number depending on the implementation, such as number 80 or a number over 1024. Similarly, any suitable network protocol, such as transmission control protocol (TCP), may be used in the rule database 100. In use, a packet received by a network router may be considered fully matching one or more of the rules when all dimensions match information contained in the header of the packet.

Figure 1B:
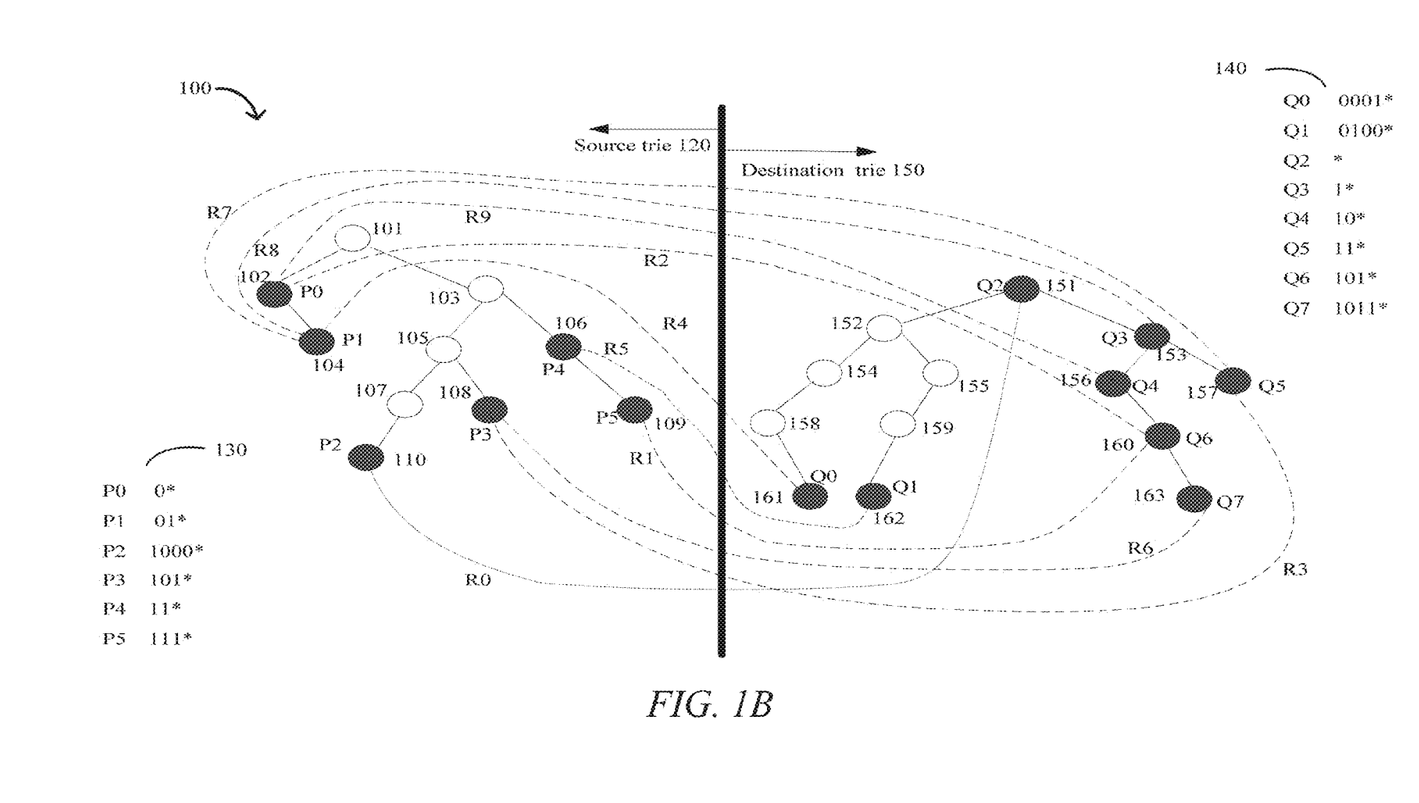
FIG. 1B illustrates part of the dimensions of the rule database shown in FIG. 1A from a different perspective.

FIG. 1B illustrates part of the dimensions of the rule database 100 from a different perspective. Specifically, FIG. 1B shows two dimensions of the rule database 100: 1) source network address prefixes (in short as source prefix), which are denoted as P0-P5 and organized in a binary trie 120, and 2) destination network address prefixes (in short as destination prefix)), which are denoted as Q0-Q7 and organized in a binary trie 150. Values of the prefixes P0-P5 and Q0-Q7 are specified in prefix tables 130 and 140, respectively, which contain prefix values specified in FIG. 1A (6 unique source prefixes and 8 unique destination prefixes).

The tries 120 and 150 may be data structures used in organizing network address prefixes used in packet classification. Specifically, the trie 120 may include a plurality of nodes or vertexes 101-110 and represent source prefixes in the table 130, and the trie 150 may include a plurality of nodes or vertexes 151-163 and represent destination prefixes in the table 140. In the trie 120, a left child node may indicate a 0 and a right child node may indicate a 1. For example, a left child node 102 from the root node 101 corresponds to a 0, and a right child node 103 from root node 101 corresponds to a 1. All other nodes in tries 120 and 150 follow the same pattern. For example, traversing from the root node 101 to a leaf node 110 may go through one right traversal to node 103, one left traversal to node 105, one left traversal to node 107, and one left traversal to node 110. As a result, node 110 represents the prefix P2 of 1000. Further, the nodes 101-110, as shown in FIG. 1B, are numbered based on a breadth-first order, in which a parent node may precede a child node, and a left child node may precede a right child node.

Note that an asterisk symbol ("*") following a prefix denotes any combination of bits thereafter, and is not part of the prefix itself. For example, Q2 in the prefix table 140 represents "*" indicating that Q2 can be a prefix to any network address. Because root node 151 does not need any traversal in trie 150, node 151 represents Q2. For another example, P4 represents "11*" indicating that P4 can be a prefix to any network address beginning with "11." In other words, P4 corresponds to network address prefix "11" and is represented by node 106. Also, note that the trie 120 is constructed to represent prefixes stored in a network router. Hence, some of the nodes in trie 120 may not correspond to any prefix. These non-prefix or intermediate nodes are denoted using white circles in FIG. 1B, while the prefix nodes are denoted using black circles.

To classify an incoming packet comprising, e.g., in its header, a source network address and a destination network address, the tries 120 and 150 may need to be looked up first. The source network address may be matched to one or more source prefixes, and the destination network address may be matched to one or more destination prefixes, such that one or more rules corresponding to the incoming packet may be identified. During the address lookup process, multiple bits of the source or destination network address may be examined at a time. The number of bits examined each time can be referred to as a stride size. As shown in FIG. 1B, the trie 120 representing the prefixes P0-P5 may be divided into subtries, each representing a tree traversal of stride size. Thus, the trie 120 can be referred as a multi-bit trie. Subtries also have parent and child relationship, and this relationship is transitive. For example, if subtrie B is a child subtrie of subtrie A, and subtrie C is a child subtrie of subtrie B, subtrie C is also considered a child subtrie of subtrie A.

As shown in FIG. 1B, each of the rules R0-R9 in the database 100 is represented by a dotted line connecting two dark vertexes. There may be independent rules and dependent rules. Independent rules, including R3, R4, and R6 may be identified by leaf prefixes in both source and destination prefixes, while dependent rules may have at least one prefix that is not a leaf prefix. In use, if a packet matches an independent rule, it cannot match any other rule; on the other hand, if the packet matches a dependent rule, it may match one or more additional rules (multiple matches).

In existing TCAM-assisted algorithms, TCAM area may be reduced for independent rules. Specifically, the leaf prefixes may be stored into a TCAM, while fields for the remaining dimensions (e.g., port number, protocol) may be stored into a non-TCAM memory, such as a static random access memory (SRAM). For dependent rules, all dimensions may still need to be fully stored into a TCAM. For example, for the rule database 100, independent rules R3, R4, and R6, may be stored in a relatively narrow TCAM and a SRAM, while dependent rules, such as R0-R2 and R5, may be stored fully in a relatively wide TCAM (in terms of physical width). In comparison, embodiments taught in the present disclosure may use a multi-dimensional hashed trie that is assisted by a TCAM, thereby reducing TCAM area for both independent and dependent rules.

Figure 2:
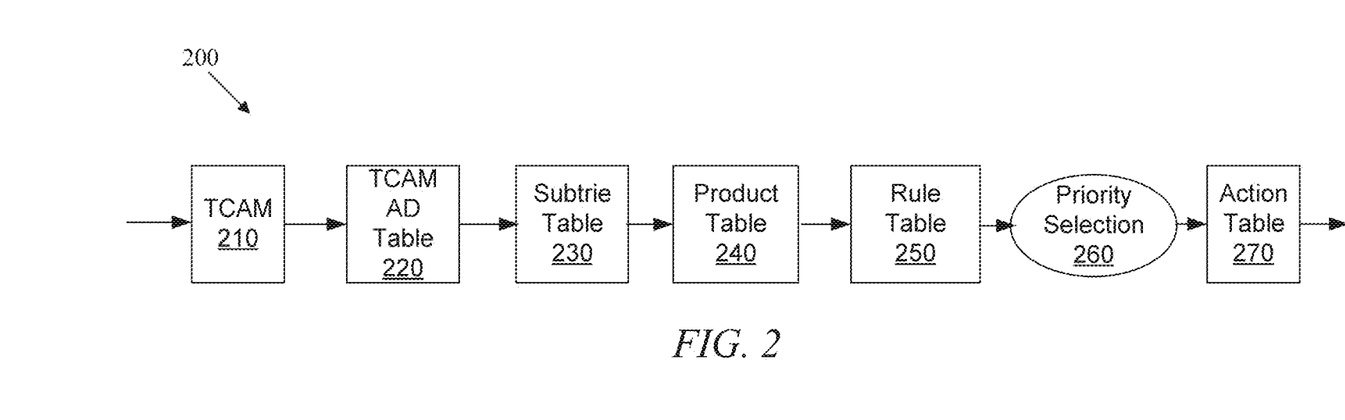
FIG. 2 illustrates an embodiment of a processor system.

FIG. 2 illustrates an embodiment of a processor system 200, in which disclosed lookup algorithms may operate. The system 200 may comprise a TCAM 210, a TCAM-associated data (AD) table 220, a subtrie table 230, a product table 240, a rule table 250, a priority selection unit or module 260, and an action table 270, arranged as in FIG. 2. As mentioned previously, the TCAM 210 may be a special type of CAM that allows a ternary matching state of "X" or "do not care" for one or more bits in a stored dataword, such as a network address. Herein, the TCAM 210 may be configured to store one or more pair of roots for independent IP and/or MAC tries (e.g., the trie 120 and trie 150). For example, a root pair stored in the TCAM 210 may comprise a root (e.g., the root 102) from the source trie 120 and a root (e.g., the root 151) from the destination trie 150. To differentiate IP and MAC roots, each root stored in the TCAM 210 may comprise a type field. Note that roots can have different lengths.

The associated data for a root pair (stored as an entry in the TCAM 210) may be stored in entries of the TCAM AD table 220. A TCAM AD table entry may comprise associated data to indicate or specify the length of each root of its root pair, whether the associated root is a prefix, and/or the length of additional network address bits after the bits in the root to be used in generating a hash key. The hash key may be generated or computed using the additional bits, denoted as PartKey, of each associated root, and identifier of the TCAM entry. Subsequently, the hash key may be used to locate an entry in the subtrie table 230. Upon a hash hit, an associated entry in the subtrie table 230 may be read, where the entry represents a pair of subtries within the independent multi-dimensional trie, which may be a combination of the source trie 120 and the destination trie 150, with the common root pair stored in the TCAM entry. Then, the source and destination network address bits after their PartKey may be used to perform a prefix match search in the subtrie.

Note that the tables described herein may be implemented as data structures stored in at least one non-TCAM memory, such as a static random access memory (SRAM). For example, the subtrie table 230 and/or the product table 240 may be implemented as hash tables and searched using hash key(s). Further, the subtrie table 230 and/or the product table 240 may be split into two (or more) tables, e.g., with a 2-left hash table for key hashing and a linear table that stores the associated data. Although a 2-left hash table is used as an example, it should be understood that any other suitable type of hash table may be used. Further, the rule table 250 and the action table 270 may be implemented as linear tables.

The encoding of a subtrie may use various schemes. For example, a relatively dense subtrie may be encoded as a bit map, while a relatively sparse subtrie may be encoded as a rich prefix node or multiple layers of enhanced trie nodes and rich prefix nodes. Using enhanced trie nodes and/or rich prefix nodes, the associated PartKey may be added as part of the subtrie encoding for hash verification. More details on subtrie encoding can be found in U.S. patent application Ser. No. 13/464,840 filed May 4, 2012 by Z. Wang et al. and entitled "Optimized Trie-Based Address Lookup," and U.S. patent application Ser. No. 13/920,306 filed Jun. 18, 2013 by Z. Wang and entitled "Internet Protocol and Ethernet Lookup Via Unified Hashed Trie," which are incorporated herein by reference.

Figure 3:
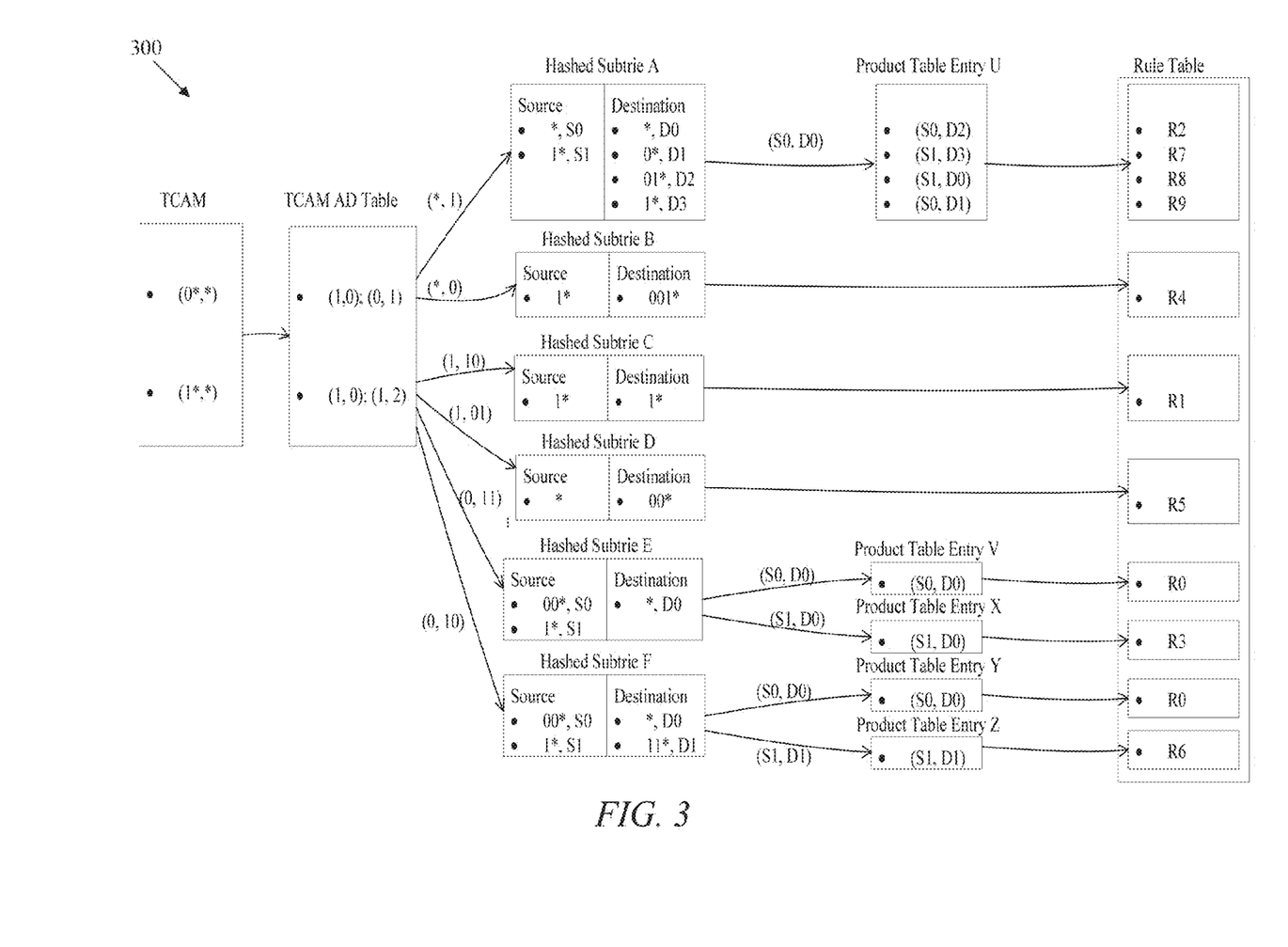
FIG. 3 illustrates an embodiment of a packet classification implementation.

FIG. 3 illustrates an embodiment of a packet classification implementation 300, which may be used in a processor system, such as the system 200. For illustrative purposes, the implementation 300 still uses the rule database 100 to demonstrate principles of the disclosed embodiments, although a person of ordinary skill in the art will recognize similar methods may apply to any other applicable rules or flows. As shown in FIG. 3, a TCAM (e.g., the TCAM 210) comprises two TCAM entries, which may be configured to store information using the format of (source prefix, destination prefix). For example, the first entry is (0*, *) and the second entry is (1*, *). Here, the first entry of (0*, *) may indicate that it matches one or more rules with source prefix 0* and destination prefix *. It should be understood that the formats or data forms used herein may serve as examples, thus any other format or form may be used within the principles disclosed herein.

Data associated with the TCAM entry may be stored in a TCAM AD table (e.g., the TCAM AD table 220). In an embodiment, the associated data may take the format of (TCAM source prefix length, TCAM destination prefix length); (srcKeyPartLen, dstKeyPartLen). Here, notations srcKeyPartLen and dstKeyPartLen may indicate, respectively, the number of source and destination address bits immediately trailing the matching TCAM source and destination prefix length. Thus, the first TCAM AD entry (1,0); (0,1) may indicate that the corresponding TCAM entry has a source prefix length of 1 bit (in short as 1b) and a destination prefix length of 0b, that no bit in the source network address should be used in generating a hash key, and that the first bit of the destination network address should be used in generating the hash key for subtrie hashing.

There may be a plurality of hashed subtries, such as subtries A-F shown in FIG. 3, contained in a subtrie table. Alternatively, each subtrie may be implemented as a separate subtrie table, if so desired. A hash key may be generated to locate a hashed subtrie (e.g., the hashed subtrie A) among the hashed subtries. Thus, the trie comprising the hashed subtries is considered a hashed trie, as it is searchable using hash keys. The hash key may be generated using associated data stored in the TCAM AD table. In addition to the source and destination address bits defined by the TCAM AD entry, information identifying a corresponding TCAM entry (e.g., a TCAM address or a software identifier assigned to the TCAM entry)

may also be used as part of the subtrie hashing key to distinguish different TCAM entries. In the interest of clarity, the hash key corresponding to the hashed subtrie A is shown in FIG. 3 as (*, 1), wherein 1 indicates that the first bit of the destination network address has a value of 1, while the hash key corresponding to the hashed subtrie B is shown in FIG. 3 as (*, 0), wherein 0 indicates that the first bit of the destination network address has a value of 0.

Similar to the first TCAM AD entry, the second TCAM AD entry of (1,0); (1, 2) may indicate that the TCAM entry has a source prefix length of 1b and a destination prefix length of 0b, that the second source address bit should be used in generating the hash key, and that the first two bits of the destination address should be used in generating the hash key for subtrie hashing. Similarly, the hash key corresponding to the hashed subtrie C is shown as (1, 10), wherein 1 indicates that the second bit of the source address has a value of 1, and 10 indicates that the first two bits of the destination address have a value of 10.

The hashed subtrie A may have a source subtrie (e.g., a subtrie in the trie 120) comprising prefixes P0 and P1 with its root at P0, as well as a destination subtrie comprising prefixes Q3, Q4, Q6, and Q5 with its root at Q3. One or more layers of the hashed subtrie A may be encoded as a bit map, an enhanced trie node, a rich prefix node, or combinations thereof.

Figure 4:
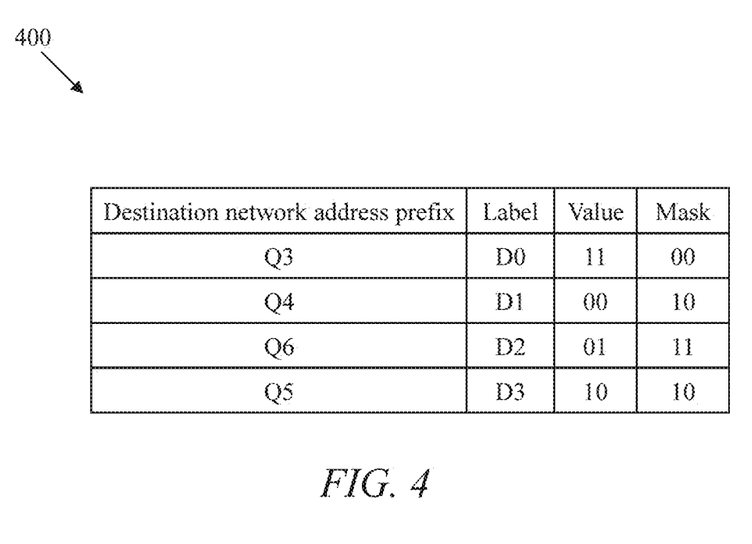
FIG. 4 illustrates an embodiment of a labeling implementation.

In an embodiment, besides subtrie encoding, each source prefix and destination prefix in a hashed subtrie may be assigned a label. For example, FIG. 4 illustrates an embodiment of a labeling implementation 400, which can be used in the hashed subtrie A in FIG. 3. The implementation 400 shows that Q3 may be assigned a label D0, Q4 may be assigned a label D1, Q6 may be assigned a label D2, and Q5 may be assigned a label D3. Further, each label may comprise two parameters denoted as (Value, Mask). For a specific subtrie, such as the hashed subtrie A (including both source subtrie and destination subtrie), the Value part of a label in the source subtrie may be unique among all labels in the source subtrie. Similarly, the Value part of a label in the destination subtrie may be unique among all labels in the destination subtrie.

In an embodiment, the label assignment in source and destination subtries may reflect the parent-child relationship of their associated prefixes. In the implementation 400, the Value and Mask may be configured such that a set bit (i.e., 1) in a Mask indicates that the corresponding Value bit matters, while a clear bit (i.e., 0) in a Mask indicates "do not care" for the corresponding Value bit. For example, since Q4 (with label D1) is the parent prefix of Q6 (with label D2), which can be seen from FIG. 1B, D1 and D2 may be designed such that the following equation holds true:

$$D2.Value \text{ \& } D1.Mask == D1.Value \text{ \& } D1.Mask \quad (1)$$

Using values in FIG. 4, Equation (1) converts to 01&10==00&10 which equals 00. In other words, the logic and (&) operation using D2.Value and D1.Mask results in an equal value with the & operation using D1.Value and D1.Mask.

Note that the equation (1) confirms that Q4 is parent of Q6, so the equation (1) will not hold true the other way around. In other words, D1 and D2 may be designed such that the following equation holds true:

$$D1.Value \text{ \& } D2.Mask != D2.Value \text{ \& } D2.Mask \quad (2)$$

For example, using values in FIG. 4, in Equation (2) D1.Value & D2.Mask=00&11=00, which does not equal D2.Value & D2.Mask=01&11=01.

Further, the above principle may also hold true for two prefixes not having any parent-child relationship. For example, since Q5 (with label D3) and Q4 (with label D1) have no parent-child relationship, D1 and D3 may be designed such that the following two equations hold true:

$$D3.Value \text{ \& } D1.Mask != D1.Value \text{ \& } D1.Mask \quad (3)$$

$$D1.Value \text{ \& } D3.Mask != D3.Value \text{ \& } D3.Mask \quad (4)$$

A quick check of the values in FIG. 4 will confirm that equations (3) and (4) hold true. It should be understood that as long as the relationship between a parent prefix and a child prefix may be verified, the Value and Mask parts in a label may use any suitable value.

Now refer back to FIG. 3. In an embodiment, when searching the hashed subtrie A, looking up a source network address in its source subtrie portion may return labels for both the shortest prefix match (SPM) (denoted as S.SPM) and longest prefix match (LPM) (denoted as S.LPM). Similarly, looking up a destination network address in its destination subtrie may return labels for both the SPM (denoted as D.SPM) and LPM (denoted as D.SPM). Consider, for example, matching an incoming packet (with a source address and a destination address) to rule R7 which is associated with source prefix P1 (with label S1) and destination prefix Q5 (with label D3). During the lookup process, bits of the source address may be matched with source prefixes in the trie 120. If rule R7 is matched, lookup results may return labels S0 as S.SPM and S1 as S.LPM. Further, bits of the destination address may be matched with destination prefixes in the trie 150. If rule R7 is matched, lookup results may further return D0 as the D.SPM and D3 as the D.LPM.

In an embodiment, a second hash key may be generated to locate an entry in a product table (or locate a field in a product table entry, depending on the implementation). Generation of the second hash key may take into account the Value parts of labels from the shortest matches, denotable as S.SPM.Value and D.SPM.Value, and a hashed subtrie address within the hashed subtrie table. For example, for a packet matching rule R7, its corresponding second hash key may be computed using label S0, label D0, and address of the hashed subtrie A. In the interest of clarity, the second hash key for rule R7 is denoted in FIG. 3 as (S0, D0), which can be used to access product table entry U. Note that the Mask parts of S0 and D0 may not be needed in computing the hash key (Value parts used).

The fields within the product table entry U may connect labels from the hashed subtrie A with rules in the database 100. For example, rule R7 may be associated with a field denoted as (S1, D3), where S1 corresponds to S.LPM and D3 corresponds to D.LPM. Since a lookup on a subtrie, such as the hashed subtrie A, may return S.SPM, S.LPM, D.SPM, and D.LPM, when the following two conditions are satisfied, the result may be deemed as a match to a field with a source label (denoted as FS) and a destination label (denoted as FD):

Condition 1:
FS is identical to S.SPM or S.LPM, or FS is a child of S.SPM and a parent of S.LPM Condition 2:
FD is identical to D.SPM or D.LPM, or FD is a child of D.SPM and a parent of D.LPM The conditions 1 and 2 may be understood through the following examples. It can be seen from FIG. 1, that R8 covers R7, since the rule R8 and rule R7 the same source prefix P1, source and destination ports, and protocol, and the destination prefix Q3 for R8 is the parent of destination prefix Q5 for R7. Assume, in a first example, that a packet comprises the (source address, destination address) of (010000, 110000). A lookup using the source and destination addresses may return S0 as S.SPM, S1 as S.LPM, D0 as D.SPM, and D3 as D.LPM. Applying the conditions 1 and 2 above, it can be seen that both fields (S1, D0) and (S1, D3) match the lookup result as they satisfy both conditions 1 and 2, while fields (S0, D1) and (S0, D2) mismatch the lookup result as D1 and D2 fail the condition 2. Assume, in a second example, a key with (source address, destination address) of (010000, 100000) returns S0 as S.SPM, S1 as S.LPM, D0 as D.SPM, and D1 as D.LPM. In the second example, fields (S0, D2) and (S1, D3) mismatch the key as D2 and D3 fail condition 2. However, both fields (S1, D0) and (S0, D1) match the key as they satisfy both conditions 1 and 2. These field's associated rules are R8 and R9, which are intersecting rules. Specifically, the source prefix P0 for R9 is the parent of source prefix P1 for R8, while the destination prefix Q3 for R8 is the parent of the destination prefix Q4 for R9. Further, the rules R8 and R9 are intersecting rules as they share the same source port, destination port, and protocol.

In an embodiment, fields within the product table entry U may be ordered according to the priority of their associated rules, which may be determined by a rule table. For example, the first matching field in the product table entry U may be deemed as having the highest priority. As a result, a packet with address bits (010000, 110000) may resolve to (S1, D3) associated with rule R7, while a packet with address bits (010000, 100000) may resolve to (S1, D0) associated with rule R8.

As shown in FIG. 3, a product table may be configured to map rules to multi-dimensional labels. In a product table entry, each field may have an index or pointer directed to associated data in a rule table, and each entry in the rule table may store information for source port, destination port, and protocol for its matching rule. In use, a packet's source and destination ports, and protocol fields may be compared with the associated entry in the rule table, and a match indicates a full classification of the packet. Thus, efficient search through multi-dimensional hashed subtries and product table for rule matching may be realized.

In FIG. 3, it can be seen that some of the hashed subtries may not have parent-child relationship among labels in its source subtrie portion. For example, there is no parent-child relationship among labels in the source subtrie portion of the hashed subtrie F. As a result, each of two hash keys from the subtrie F to the product table may be associated with an entry of one field. This is because subtrie F is associated with leaf rules, such as R0 and R6, which have at least one dimension with a leaf prefix (e.g., P2 as source prefix of rule R0). In use, if the rule database is dominated by leaf rules, the product table structure and search process may be simplified accordingly to obtain benefits, e.g., saving chip area.

Note that, in addition to storing common roots of multi-dimensional hashed subtries, a TCAM (e.g., the TCAM 210) may be configured to store a packet classification rule (e.g., one or more of R0-R9). In order to support the cases when a packet matches both a rule in the TCAM and a trie/subtrie root in the TCAM, the TCAM may be configured to support multiple match indications. In an embodiment, an entry in a TCAM AD table (e.g., the TCAM AD table 220) may indicate whether its associated TCAM entry is a rule or a subtrie root. If the TCAM entry is a rule, the TCAM AD entry may further indicate priority information and action table pointer corresponding to the rule.

Further, when a packet matches multiple rules in the TCAM and a trie/subtrie root in the TCAM, the priority information may be used to select the rule that has the highest priority. For the matched subtrie root, its associated entries in a subtrie table (e.g., the subtrie table 230), a product table (e.g., the product table 240), and a rule table (e.g., the rule table 250) may be searched using procedures described herein. A rule priority field and an action table pointer may be added to the rule table. Priority selection may be performed by comparing priorities from the rule table and selecting the highest priority from the matched rules (stored in the TCAM 210). Further, the rule with higher priority may be selected using a priority selection module (e.g., the priority selection module 260) to index an action table (the action table 270.)

The disclosed embodiments may be applied to a case in which a network address matches multiple subtrie roots in the TCAM. In this case, the often-expensive TCAM may still be searched once as it supports multiple matches, while other data structures including the subtrie table, the product table, and/or the rule table may be searched two or more times. Each search of the other data structure may be for each matching TCAM subtrie root. Moreover, priority selection may be performed to find the matching rule with the highest priority to index the action table.

Figure 5:
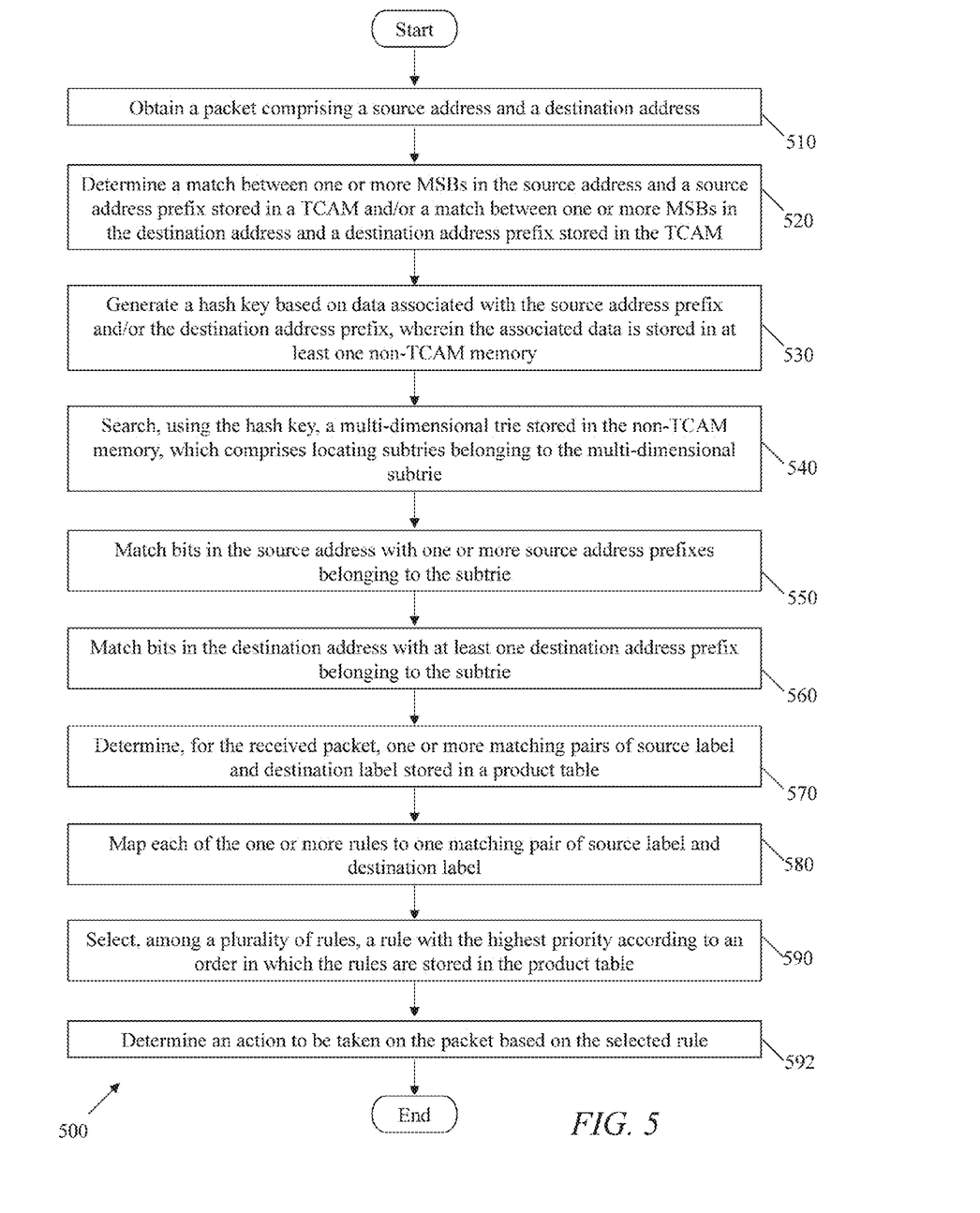
FIG. 5 illustrates an embodiment of a packet classification method.

FIG. 5 illustrates an embodiment of a packet classification method 500, which may be implemented by a network device comprising a processor system (e.g., the system 200). Starting in step 510, the method 500 may obtain or receive a packet comprising a source address and a destination address. Note that the packet may be obtained locally or remotely from another network device, may be formatted using any suitable structure, and may comprise other dimensions of information, such as source port, destination port, protocol, etc.

In step 520, the method 500 may determine a match between one or more most significant bits (MSBs) in the source address and a source address prefix stored in a TCAM (e.g., the TCAM 210), or a match between one or more MSBs in the destination address and a destination address prefix stored in the TCAM, or both. As described previously, if the source or destination address prefix stored in the TCAM is simply a "*", any received packet may be considered a match.

In step 530, the method 500 may generate a hash key based on data associated with at least one of the source address prefix and the destination address prefix, wherein the associated data is stored in at least one non-TCAM memory (e.g., the TCAM AD table 220). For example, an entry in the TCAM AD table may specify what information to use in computing the hash key, e.g., whether to use data associated with the source address prefix, or the destination address prefix, or both. Further, the information used in computing the hash key may comprise, for example, a PartKey (a number of bits following the prefix in TCAM) and an address of the corresponding TCAM entry or a software-defined identifier for the TCAM entry.

In step 530, the method 500 may search, using the hash key, a multi-dimensional trie stored in the at least one non-TCAM memory. For example, the multi-dimensional trie may be stored as hashed subtries in a subtrie table, and multiple subtries (e.g., a source subtrie and a destination subtrie) belonging to the hashed multi-dimensional trie may be located during the search. In step 540, the method 500 may map the received packet to one or more rules based on the search. Note that mapping the packet may be further based on other results as well, thus the term "based on" may indicate full or partial dependence. In step 550, the method 500 may match bits (e.g., bits trailing the PartKey) in the source address with one or more source address prefixes belonging to the subtrie. In step 560, the method may match bits in the destination address (e.g., bits trailing the PartKey) with at least one destination address prefix belonging to the subtrie.

In an embodiment, the one or more matched source address prefixes comprise a SPM whose label is denotable as S.SPM and a LPM whose label is denotable as S.LPM, and the at least one matched destination address prefix comprises a SPM whose label is denotable as D.SPM and a LPM whose label is denotable as D.LPM. Thus, the S.SPM, S.LPM, D.SPM, and D.LPM may be returned after searching the multi-dimensional trie.

In step 570, the method may determine, for the received packet, and based on the one or more matched source address prefixes and at least one destination address prefix, one or more matching pairs of source label and destination label stored in a product table (e.g., in a product table entry). As described previously, each of the one or more source address prefixes and the at least one destination address prefix may be assigned a label, thereby resulting in a plurality of labels. Further, recall that each label reflects parent-child relationship of associated prefixes. The one or more matching pairs of source label and destination label may be determined using S.SPM, S.LPM, D.SPM, and D.LPM. In an embodiment, conditions 1 and 2 disclosed herein may be used in determining the matching pair(s).

Suppose, for example, that the prefixes belonging to the subtrie comprise two exemplary prefixes: a first prefix and a second prefix which is a child of the first prefix, which can be source or destination address prefix. Further, suppose the first prefix is assigned a first label comprising a first Value and a first Mask, and the second prefix is assigned a second label comprising a second Value and a second Mask. Based on Equations (1) and (2) herein, it can be seen that a logic and operation using the second Value and the first Mask leads to an equal result with a logic and operation using the first Value and the first Mask, and wherein a logic and operation using the first Value and the second Mask leads to an unequal result with a logic and operation using the second Value and the second Mask.

On the contrary, suppose that the first and second prefixes do not have any parent-child relationship. Based on Equations (3) and (4) herein, it can be seen that a logic and operation using the second Value and the first Mask leads to an unequal result with a logic and operation using the first Value and the first Mask, and wherein a logic and operation using the first Value and the second Mask leads to an unequal result with a logic and operation using the second Value and the second Mask.

In step 580, the method 500 may map each of the one or more rules to one matching pair of source label and destination label. The rules may be stored in a rule table or the TCAM, as described previously. If a plurality of rules are mapped in step 580, in step 590, the method 500 may select, among the plurality of rules, a rule with the highest priority according to an order in which the rules are stored in the product table. In step 592, the method 500 may determine an action to be taken on the packet based on the selected rule. The action may be specified in an action table which may be indexed by the rules.

As a person of ordinary skill in the art understands that, in implementation, variations of the method 500 may be possible, certain steps may sometimes be skipped, additional steps may be added as necessary, and execution order may be exchanged provided that one step does not depend on a preceding step. For example, if there is only one rule matched for the packet, step 590 may be skipped as there is no need to priority selection.

It should be understood by a person of ordinary skill in the art that, even though the present disclosure mostly uses source address and destination address as two exemplary dimensions of rules to illustrate the principle of matching multi-dimensional tries, dimensions other than source and destination addresses (e.g., source port, destination port, protocol, or any other suitable dimension) can be used without departing from the disclosed principles. Further, if desired, more than two dimensions can be used in matching multi-dimensional tries. Generally, a packet header may comprise a plurality of dimensional fields (in short as fields), which may be specified by a set of rules. As described above, in packet classification disclosed herein, at least two of the fields in the packet may be matched with two dimensions of the rules by using the corresponding entry stored in the TCAM and data stored in the multi-dimensional trie stored in at least one non-TCAM memory.

Overall, embodiments of a TCAM assisted-packet classification are taught herein to provide desirable attributes such as high speed and low latency for data center and/or cloud applications. Significant memory savings may be possible to achieve by enabling low cost on-chip search engine implementation.

Figure 6:
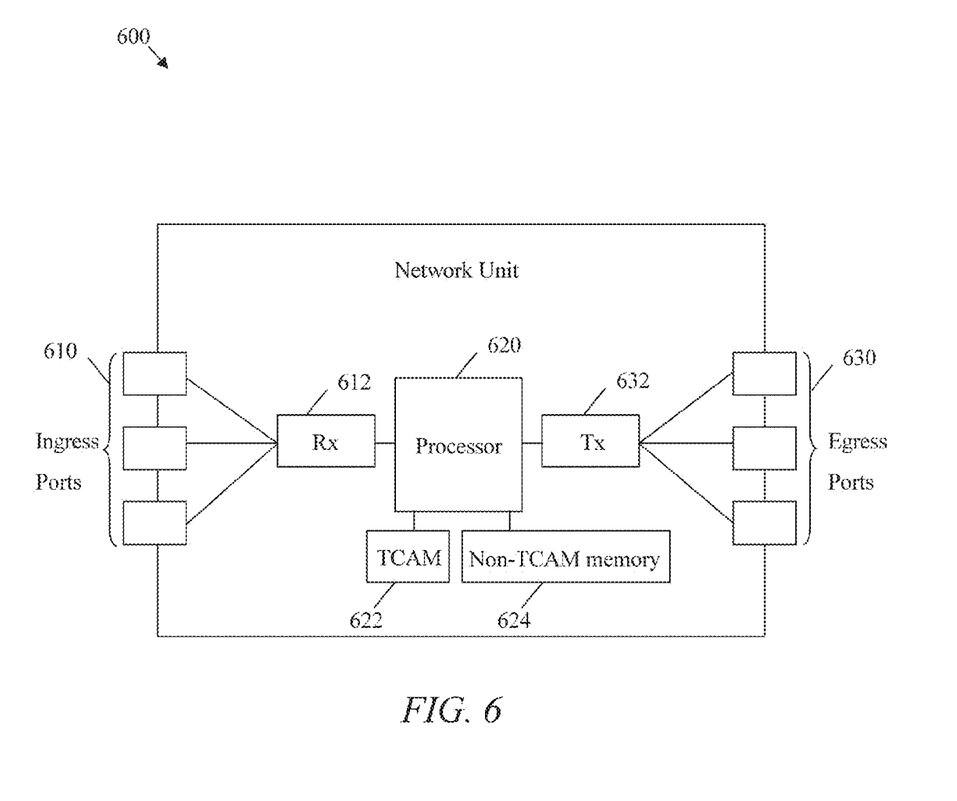
FIG. 6 illustrates an embodiment of a network unit.

FIG. 6 illustrates an embodiment of a network device or unit 600, which may be any device configured to transport packets through a network. For instance, the network unit 600 may be a network router wherein the system 200 resides. The network unit 600 may comprise one or more ingress ports 610 coupled to a receiver 612 (Rx), which may be configured for receiving packets or frames from other network components. The network unit 600 may comprise a logic unit or processor 620 coupled to the receiver 612 and configured to process the packets or otherwise determine which network components to send the packets. The processor 620 may be implemented using hardware, or a combination of hardware and software.

The network unit 600 may further comprise a TCAM 622 and at least one non-TCAM memory 624. The TCAM 622 may be configured to store roots and/or prefixes for independent tries. A non-TCAM memory 624 may be configured to store a TCAM AD table, a hashed subtrie table, a product table, a rule table, and an action table. Note that the tables may take any other form of data structure to fulfill functionalities taught herein. The network unit 600 may also comprise one or more egress ports 630 coupled to a transmitter 632 (Tx), which may be configured for transmitting packets or frames to other network components. Note that, in practice, there may be bidirectional traffic processed by the network unit 600, thus some ports may both receive and transmit packets. In this sense, the ingress ports 610 and the egress ports 630 may be co-located or may be considered different functionalities of the same ports that are coupled to transceivers (Rx/Tx). The processor 620, the TCAM 622, the non-TCAM memory 624, the receiver 612, and the transmitter 632 may also be configured to implement or support any of the schemes and methods described above, such as the implementation 300 and the method 500.

It is understood that, by programming and/or loading executable instructions onto the network unit 600, at least one of the processor 620, the TCAM 622, and the non-TCAM memory 624 can be changed. As a result, the network unit 600 may be transformed in part into a particular machine or apparatus (e.g. a memory system or subsystem having the functionality taught by the present disclosure). The executable instructions may be stored on the non-TCAM memory 624 and loaded into the processor 620 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner, as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of packet classification implemented by a network router, the method comprising:
    obtaining a packet whose header comprises a plurality of dimensional fields specified by a set of rules;
    matching one or more bits in at least two of the dimensional fields with a corresponding entry stored in a ternary content-addressable memory (TCAM);
    generating a hash key based on data associated with the corresponding entry in the TCAM, wherein the associated data is stored in at least one non-TCAM memory;
    searching, using the hash key, a multi-dimensional trie stored in the at least one non-TCAM memory; and
    mapping the packet to one or more of the set of rules based on the search.

2. The method of claim 1, wherein the at least two dimensional fields in the packet comprise a first dimensional field and a second dimensional field, wherein the multi-dimensional trie comprises at least two subtries for at least two dimensions specified by the set of rules, wherein the at least two subtries comprise a first subtrie and a second subtrie, wherein mapping the packet comprises:
    matching bits in the first dimensional field with data stored in the first subtrie; and
    matching bits in the second dimensional field with data stored in the second subtrie.

3. The method of claim 2, wherein the first and second dimensional fields are selected from the group consisting of source address, destination address, source port number, destination port number, and protocol.

4. The method of claim 2, wherein the first dimensional field is a source address and the second dimensional field is a destination address, wherein the corresponding entry in the TCAM comprises at least one of a source address prefix and a destination address prefix, wherein the data stored in the first subtrie comprises one or more source address prefixes, wherein the data stored in the second subtrie comprises at least one destination address prefix.

5. The method of claim 4, wherein each of the one or more source address prefixes and the at least one destination address prefix is assigned a label, which results in a plurality of labels, and wherein each label reflects parent-child relationship of associated prefixes, wherein mapping the packet further comprises:
    determining, for the packet, and based on the one or more matched source address prefixes and at least one destination address prefix, one or more matching pairs of source label and destination label stored in a product table; and mapping each of the one or more rules to one matching pair of source label and destination label.

6. The method of claim 5, wherein the prefixes belonging to one of the first and second subtries comprise a first prefix and a second prefix which is a child of the first prefix, wherein the first prefix is assigned a first label comprising a first Value and a first Mask, and the second prefix is assigned a second label comprising a second Value and a second Mask, wherein a logic and operation using the second Value and the first Mask leads to an equal result with a logic and operation using the first Value and the first Mask, and wherein a logic and operation using the first Value and the second Mask leads to an unequal result with a logic and operation using the second Value and the second Mask.

7. The method of claim 5, wherein the prefixes belonging to one of the first and second subtries comprise a first prefix and a second prefix which has no parent-child relationship with the first prefix, wherein the first prefix is assigned a first label comprising a first Value and a first Mask, and the second prefix is assigned a second label comprising a second Value and a second Mask, wherein a logic and operation using the second Value and the first Mask leads to an unequal result with a logic and operation using the first Value and the first Mask, and wherein a logic and operation using the first Value and the second Mask leads to an unequal result with a logic and operation using the second Value and the second Mask.

8. The method of claim 5, wherein the one or more matched source address prefixes comprise a shortest prefix match (SPM) whose label is denotable as S.SPM and a longest prefix match (LPM) whose label is denotable as S.LPM, wherein the at least one matched destination address prefix comprises a SPM whose label is denotable as D.SPM and a LPM whose label is denotable as D.LPM, and wherein the one or more matching pairs of source label and destination label are determined using S.SPM, S.LPM, D.SPM, and D.LPM.

9. The method of claim 8, wherein a source label and a destination label in the one or more matching pairs of source label and destination label are denotable as FS and FD respectively, wherein FS is identical to S.SPM or S.LPM, or FS is a child of S.SPM and a parent of S.LPM, and wherein FD is identical to D.SPM or D.LPM, or FD is a child of D.SPM and a parent of D.LPM.

10. The method of claim 5, wherein the mapped rules include a plurality of rules, the method further comprising:
selecting, among the plurality of rules, a rule with the highest priority according to an order in which the rules are stored in the product table; and
determining an action to be taken on the packet based on the selected rule.

11. The method of claim 1, wherein the one or more mapped rules are stored in the TCAM, and wherein data stored in the at least one non-TCAM memory and corresponding to the rules comprises a type field that specifies the rules stored in the TCAM.

12. The method of claim 1, further comprising:
matching one or more bits in the at least two dimensional fields with a second corresponding entry stored in the TCAM;
generating a second hash key based on data associated with the second corresponding entry in the TCAM; and
searching, using the second hash key, the multi-dimensional trie for a second time.

13. An apparatus comprising:
a ternary content-addressable memory (TCAM) configured to store an entry for at least two of a plurality of dimensions specified by a set of rules;
at least one non-TCAM memory configured to:
store data associated with the entry in the TCAM; and
a multi-dimensional trie for the at least two dimensions;
a receiver configured to receive a packet comprising a plurality of fields in the plurality of dimensions;
a processor that is coupled to the receiver, the TCAM, and the at least one non-TCAM memory and is configured to:
match one or more bits in each of at least two of the fields with the entry;
generate a hash key based on the data associated with the entry;
search the multi-dimensional trie using the hash key; and
map the packet to one or more rules in the set of rules based on the search.

14. The apparatus of claim 13, wherein the at least two of the fields comprise a first field and a second field, wherein the multi-dimensional trie comprises a first subtrie and a second subtrie, wherein mapping the packet comprises:
matching bits in the first field with data stored in the first subtrie; and
matching bits in the second field with data stored in the second subtrie.

15. The apparatus of claim 14, wherein the first and second fields are selected from the group consisting of source address, destination address, source port number, destination port number, and protocol.

16. The apparatus of claim 14, wherein the first field is a source address and the second field is a destination address, wherein the entry in the TCAM comprises at least one of a source address prefix and a destination address prefix, wherein the data stored in the first subtrie comprises one or more source address prefixes, wherein the data stored in the second subtrie comprises at least one destination address prefix.

17. The apparatus of claim 16, wherein each of the one or more source address prefixes and the at least one destination address prefix is assigned a label, which results in a plurality of labels, and wherein each label reflects parent-child relationship of associated prefixes, wherein mapping the packet further comprises:
determining, for the packet, and based on the one or more matched source address prefixes and the at least one destination address prefix, one or more matching pairs of source label and destination label stored in a product table; and
mapping each of the one or more rules to one matching pair of source label and destination label.

18. The apparatus of claim 17, wherein the prefixes belonging to the subtrie comprise a first prefix and a second prefix which is a child of the first prefix, wherein the first prefix is assigned a first label comprising a first Value and a first Mask, and the second prefix is assigned a second label comprising a second Value and a second Mask, wherein a logic and operation using the second Value and the first Mask leads to an equal result with a logic and operation using the first Value and the first Mask, and wherein a logic and operation using the first Value and the second Mask leads to an unequal result with a logic and operation using the second Value and the second Mask.

19. The apparatus of claim 17, wherein the prefixes belonging to the subtrie comprise a first prefix and a second prefix which has no parent-child relationship with the first prefix, wherein the first prefix is assigned a first label comprising a first Value and a first Mask, and the second prefix is assigned a second label comprising a second Value and a second Mask, wherein a logic and operation using the second Value and the first Mask leads to an unequal result with a logic and operation using the first Value and the first Mask, and wherein a logic and operation using the first Value and the second Mask leads to an unequal result with a logic and operation using the second Value and the second Mask.

20. The apparatus of claim 17, wherein the one or more matched source address prefixes comprise a shortest prefix match (SPM) whose label is denotable as S.SPM and a longest prefix match (LPM) whose label is denotable as S.LPM, wherein the at least one matched destination address prefix comprises a SPM whose label is denotable as D.SPM and a LPM whose label is denotable as D.LPM, and wherein the one or more matching pairs of source label and destination label are determined using S.SPM, S.LPM, D.SPM, and D.LPM.

21. The apparatus of claim 20, wherein a source label and a destination label in the one or more matching pairs of source label and destination label are denotable as FS and FD respectively, wherein FS is identical to S.SPM or S.LPM, or FS is a child of S.SPM and a parent of S.LPM, and wherein FD is identical to D.SPM or D.LPM, or FD is a child of D.SPM and a parent of D.LPM.

22. The apparatus of claim 17, wherein the mapped rules include a plurality of rules, wherein the processor is further configured to:
 select, among the plurality of rules, a rule with the highest priority according to an order in which the rules are stored in the product table; and
 determine an action to be taken on the packet based on the selected rule.

23. A network router comprising:
 a ternary content-addressable memory (TCAM) configured to store a source address prefix and a destination address prefix; and
 a TCAM associated data (AD) table coupled to the TCAM and configured to store associated data for the source address prefix and the destination address prefix;
 a hashed subtrie table coupled to the TCAM AD table and configured to store a plurality of address prefixes represented by one or more subtries which belong to a multi-dimensional trie, wherein each subtrie is locatable by a hash key at least partially based on the associated data for each prefix stored in the TCAM;
 a product table coupled to the hashed subtrie table and configured to store pairs of labels assigned to the plurality of address prefixes; and
 a rule table coupled to the product table and configured to store rules each corresponding to a pair of labels in the product table.

24. The network router of claim 23, further comprising a processor coupled to the TCAM, the TCAM AD table, the hashed subtrie table, the product table, and the rule table, wherein the processor is configured to:
 determine, for a packet comprising a source address and a destination address, a match between one or more most significant bits (MSBs) in the source address and the source address prefix, or a match between one or more MSBs in the destination address and the destination address prefix, or both;
 compute the hash key based on data associated with the source address prefix and the destination address prefix;
 look up a source subtrie and a destination subtrie in the hashed subtrie table using the hash key;
 determine one or more of the pairs of labels as matching pairs based on results returned from looking up the subtrie; and
 map the packet to one or more of the rules based on the one or more matching pairs.

* * * * *